United States Patent
Al-Naffouri et al.

(10) Patent No.: US 8,483,296 B2
(45) Date of Patent: Jul. 9, 2013

(54) OFDM PEAK-TO-AVERAGE POWER RATIO REDUCTION METHOD

(75) Inventors: Tareq Y. Al-Naffouri, Dhahran (SA); Eprahim B. Al-Safadi, Dhahran (SA); Mohammed E. Eltayeb, Dhahran (SA)

(73) Assignee: King Fahd University of Petroleum and Minerals, Chahran (SA)

(*) Notice: Subject to any disclaimer, the term of this patent is extended or adjusted under 35 U.S.C. 154(b) by 822 days.

(21) Appl. No.: 12/591,655

(22) Filed: Nov. 25, 2009

(65) Prior Publication Data
US 2011/0122930 A1  May 26, 2011

(51) Int. Cl.
H04L 27/28 (2006.01)

(52) U.S. Cl.
USPC .......................................................... 375/260

(58) Field of Classification Search
USPC ................. 375/260, 219, 259, 295, 296, 315, 375/346; 370/204, 208, 209, 249, 344; 455/63.1, 91, 116, 427
See application file for complete search history.

(56) References Cited

U.S. PATENT DOCUMENTS

| | | | |
|---|---|---|---|
| 5,991,262 A * | 11/1999 | Laird et al. | 370/209 |
| 6,424,681 B1 | 7/2002 | Tellado et al. | |
| 7,292,639 B1 | 11/2007 | Demirekler et al. | |
| 7,664,472 B2 * | 2/2010 | Mosley et al. | 455/91 |
| 2005/0089109 A1 | 4/2005 | Yun et al. | |
| 2007/0071120 A1 | 3/2007 | Talwar | |
| 2007/0116142 A1 * | 5/2007 | Molander | 375/260 |
| 2007/0121483 A1 | 5/2007 | Zhang et al. | |
| 2007/0230626 A1 | 10/2007 | Tsuchie | |
| 2007/0242598 A1 | 10/2007 | Kowalski | |
| 2008/0101502 A1 | 5/2008 | Navidpour et al. | |
| 2008/0159421 A1 | 7/2008 | Chen et al. | |
| 2008/0159422 A1 * | 7/2008 | Chen et al. | 375/260 |
| 2008/0181333 A1 | 7/2008 | Jiang et al. | |
| 2008/0298490 A1 | 12/2008 | Yun et al. | |
| 2009/0052577 A1 | 2/2009 | Wang | |
| 2010/0097923 A1 * | 4/2010 | Zhao et al. | 370/210 |

FOREIGN PATENT DOCUMENTS

| | | |
|---|---|---|
| EP | 2056553 A1 | 5/2009 |
| WO | WO2007086686 A2 | 8/2007 |
| WO | WO2008100047 A1 | 8/2008 |
| WO | WO2009003278 A1 | 1/2009 |

* cited by examiner

*Primary Examiner* — Khai Tran
(74) *Attorney, Agent, or Firm* — Richard C. Litman (57) ABSTRACT

The OFDM peak-to-average power ratio reduction apparatus and method provides a compressive sensing algorithm that estimates the sparsity pattern of a sparse vector by a limited number of measurements. When the positions of the clipped peaks are known beforehand by, e.g., a genie-augmented receiver, then the algorithm optimally performs amplitude estimation utilizing a least squares estimation technique. When the cardinality of the peak-reducing signal is known at the receiver at initialization, the receiver optimizes the estimated peak-reducing signal by using least squares.

16 Claims, 11 Drawing Sheets

OFDM PEAK-TO-AVERAGE POWER RATIO REDUCTION METHOD

BACKGROUND OF THE INVENTION

1. Field of the Invention

The present invention relates to digital communications techniques, and particularly to an OFDM Peak-to-Average Power Ratio (PAPR) reduction method in orthogonal frequency division multiplexed (OFDM) signals using compressive sensing, and to a transceiver or other apparatus implementing the method.

2. Description of the Related Art

Orthogonal frequency division multiplexing (OFDM) has become a popular technique due to its high spectral efficiency and robustness to fading channels. In OFDM, the total spectrum is divided into narrow parallel sub-bands each with a bandwidth that results in minimum delay spread. An OFDM signal is typically constructed by the superposition of a large number of modulated sub-carriers. This superposition results in a signal with high Peak-to-Average Power Ratio (PAPR), which distorts the signal if the transmitter contains nonlinear components, such as high power amplifiers (HPA). The signal also suffers significant spectral spreading and in-band distortion. An intuitive solution to this problem is to back off the operating point of the HPA, which degrades the performance of the HPA, or to use linear amplifiers.

The problem of high PAPR in OFDM systems has been tackled by a variety of approaches, including coding techniques, constellation reshaping, tone-reservation, and selective mapping, to name a few. For instance, amplitude clipping can be directly applied to reduce the PAPR. However, this clipping results in in-band and out-of-band distortions, which results in Symbol-Error-Rate (SER) degradation and out-of-band radiation respectively. To counter the effect of out-of-band distortions, a filter can be applied to the clipped signal. However, this might also regenerate new peaks. Hence, amplitude clipping reduces the PAPR at the expense of quantifiable distortion.

In some techniques, symbols are mapped into code words, and extra bit(s) are added to those code words. Following that, only code words that do not result in high PAPR are chosen. This technique requires lookup tables and exhaustive search for the best code word. A simple technique known as Selected Mapping reduces the PAPR by generating different sets of data blocks and transmitting the one with the lowest PAPR. This is done by multiplying the initial data set with different phase sequences, and the optimal phase sequence is sent separately to the receiver as side information. A similar technique known as the Interleaving technique uses interleaves instead of a set of phase sequences to produce different sequences of the same data and transmit the one with the minimum PAPR.

Some methods use extra tones to add a peak-reducing signal to the original multicarrier signal to reduce the overall PAPR. This signal can be stripped off at the receiver using the information available at the reserved tones. However, none of the foregoing techniques have proven entirely satisfactory. Thus, an OFDM peak-to-average power ratio reduction method solving the aforementioned problems is desired.

SUMMARY OF THE INVENTION

The OFDM peak-to-average power ratio reduction method introduces a tone reservation-based PAPR reduction scheme that not only reduces the PAPR, but also reduces the complexity of PAPR reduction techniques based on tone reservation. This is achieved by using an extremely simple peak-reducing signal at the transmitter, and then using the reserved tones to detect the positions and amplitudes of clipped peaks by partial observation of their frequency content at the receiver. This approach uses recent advances in reconstruction of sparse signals from rank-deficient projections using convex programming, collectively known as compressive sensing (CS).

Basically, when a clipping signal is applied to cut off the high peaks of an OFDM signal, the subcarriers will be frequency distorted due to the nonlinear transformation of the random OFDM signal. The present method reserves a subset of the subcarriers (tones) and then uses appropriate techniques of compressive sensing to estimate the peak reducing signal by observing the frequency distortion on this subset at the receiver. This effectively shifts the complexity to the receiver and drastically reduces it from a function of N (the number of subcarriers in the OFDM signal) to a function of m (the number of reserved tones), which is a small subset of N.

For the sake of CS, the method conditions the additive peak-reducing signal (c) to be sparse in time. This is basically the case if the method sets a clipping threshold on the envelope of the OFDM symbols, or if the transmitter were to clip the highest (s) peaks. Since m is normally fixed, the ability to reduce the PAPR is directly related to increasing s. However, increasing s with m being fixed will result in more PAPR reduction with a penalty of increasing Symbol Error Rate (SER) due to imperfect recovery of the additive peak-reducing signal at the receiver. As such, m is an important design parameter. The larger m is, the more clipping the present method can perform and recover at the receiver, and hence the more PAPR the method can reduce.

By far, the most valuable function of compressive sensing algorithms is providing a good estimate of the sparsity pattern of a sparse vector with a limited number of measurements. However, if the positions of the clipped peaks were known beforehand, say by a genie-augmented receiver, then estimating the amplitudes at these positions by least squares is optimum. In the present method, if the cardinality of the peak-reducing signal is known at the receiver at initialization, then the receiver can optimize the estimated peak-reducing signal by using least squares.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The OFDM peak-to-average power ratio reduction method has a time-domain complex base-band equivalent channel model given by the relation:

$$y_k = \sum_{l=0}^{L} h_l z_k + z_k \quad (1)$$

where $x_k$ and $y_k$ denote the channel input and output respectively, $h=(h_0, \ldots, h_L)$ is the impulse response of the channel. $z_k$ is AWGN~$CN(0, N_0)$. To compactly notate OFDM, the present method expresses the above channel model (1) in the following matrix:

$$y = Hx + z \quad (2)$$

where y and x are the time-domain OFDM receive and transmit signal blocks (after cyclic prefix removal) and z~$CN(0, N_0 I)$.

Due to the presence of the cyclic prefix, H is a circulant matrix describing the cyclic convolution of the channel impulse response with the block x and can be decomposed as $H = F^H D F$, where the superscript H denotes the Hermitian conjugate, F denotes a unitary Discrete Fourier Transform (DFT) with (k,l) element $$[F]_{k,l} = \frac{1}{\sqrt{n}} e^{-j2\pi kl/n}$$

with k, l ∈ {0, ..., N−1}. $D = \text{diag}(\check{h})$ and $\check{h} = \sqrt{n} F H$ is the DFT of the channel impulse response.

Figure 1:
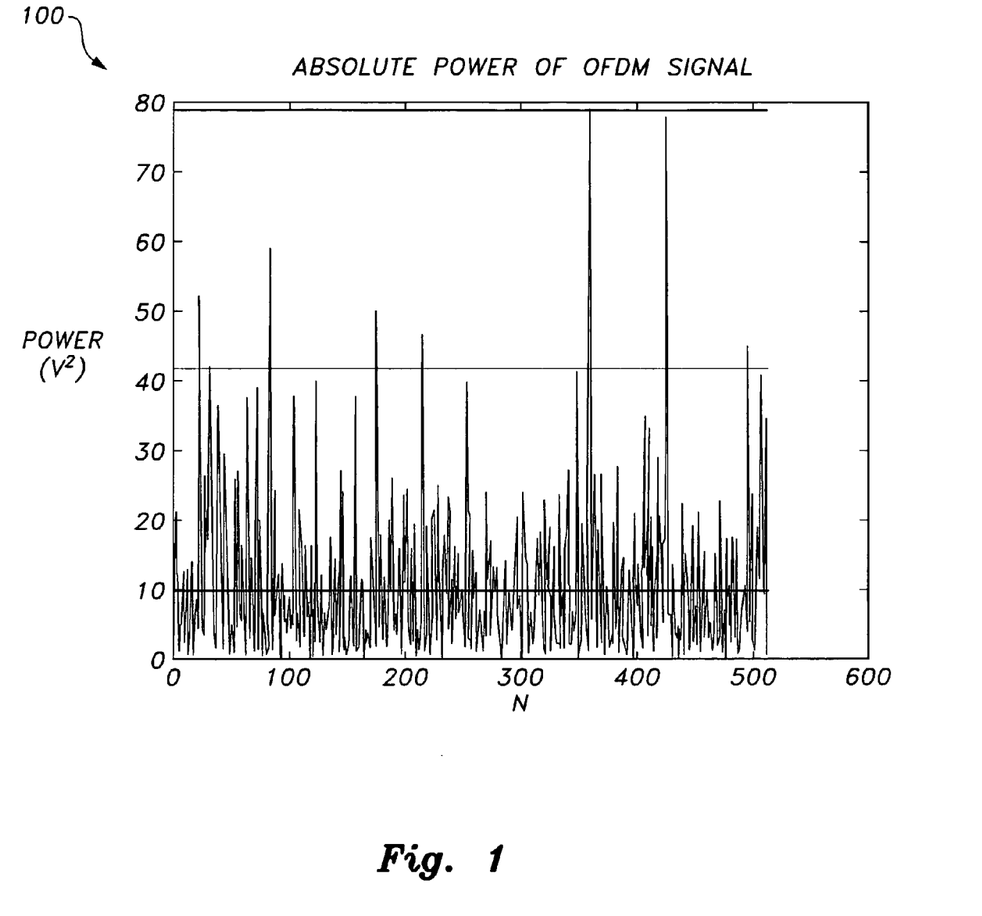
FIG. 1 shows a waveform of an OFDM signal with high peaks exceeding the clipping threshold.

Referring to FIG. 1, waveform plot 100 shows a time domain OFDM signal transmission having power amplification that produces high absolute power peaks. If the signal exceeds a threshold of the power amplifier at the transmitter and clipping was employed, the signal will be distorted at a receiver.

Figure 2A:
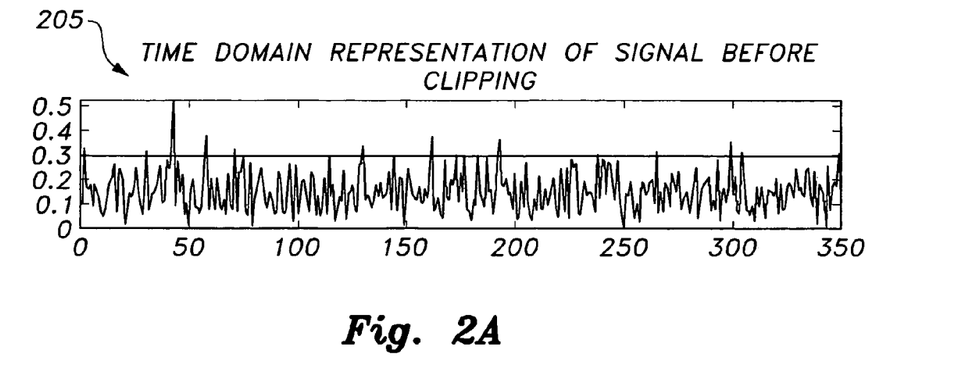
FIGS. 2A, 2B, and 2C are waveform plots showing time domain representations of an OFDM signal before clipping, a clipping signal, and the OFDM signal after clipping, showing how the peak-reducing signal is applied to the original OFDM signal with high PAPR to reduce the PAPR of the signal (Annihilation Process).
Figure 2B:
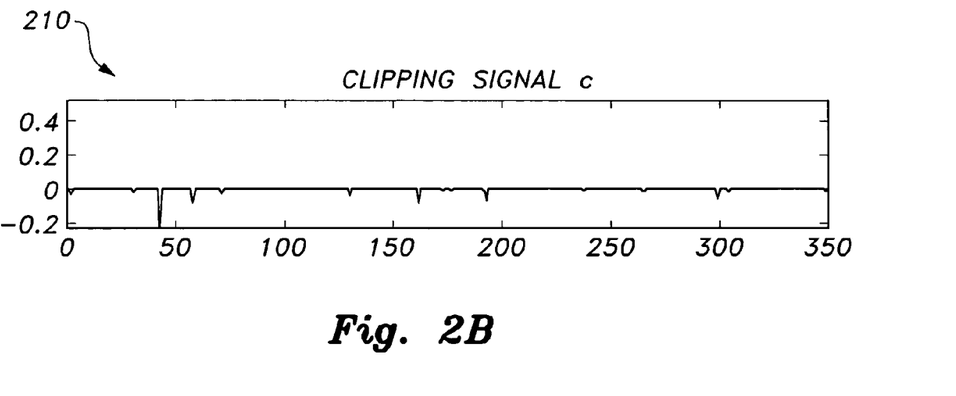
Figure 2C:
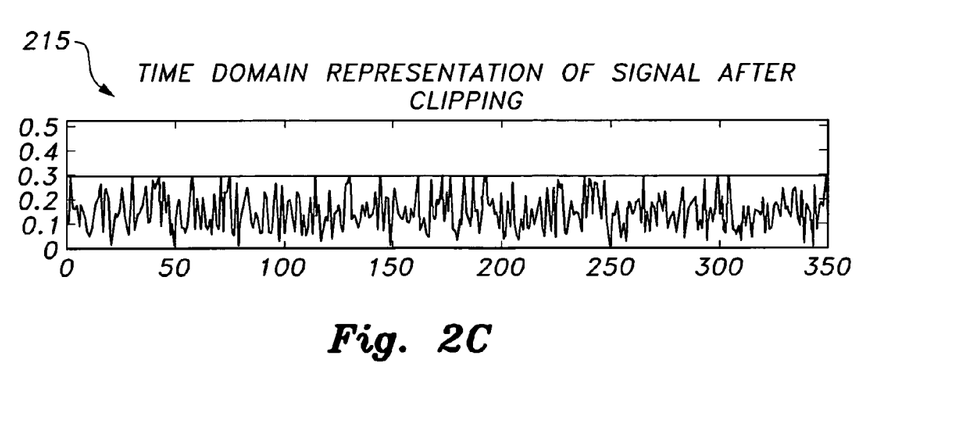
Figure 3A:
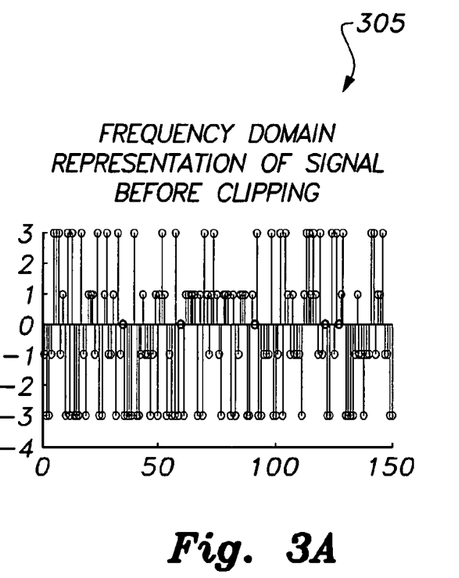
FIGS. 3A and 3B are waveform plots of an OFDM signal before and after clipping, respectively, in the frequency domain.
Figure 3B:
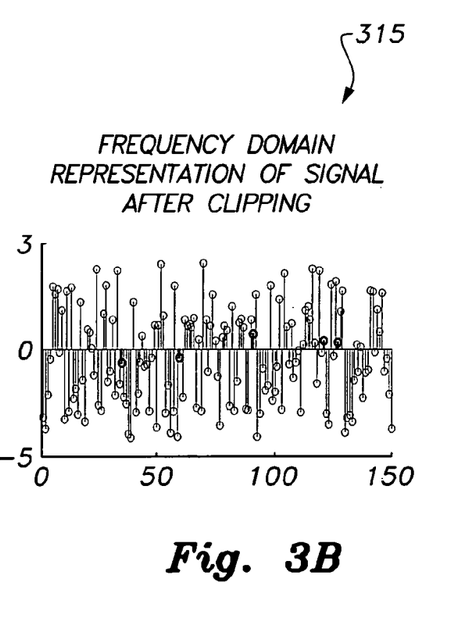
Figure 3C:
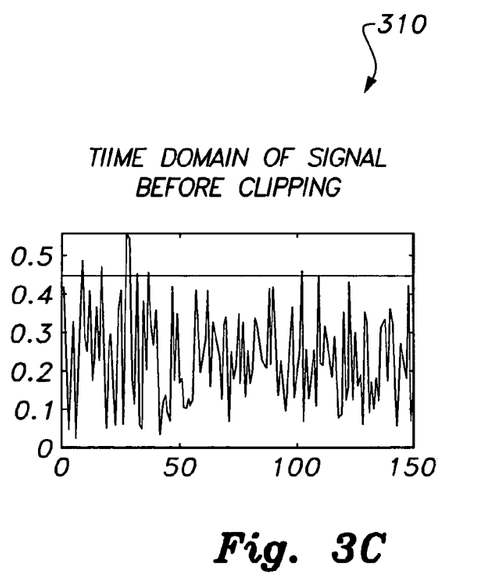
FIGS. 3C and 3D are waveform plots of the same OFDM signal before and after clipping, respectively, in the time domain.
Figure 3D:
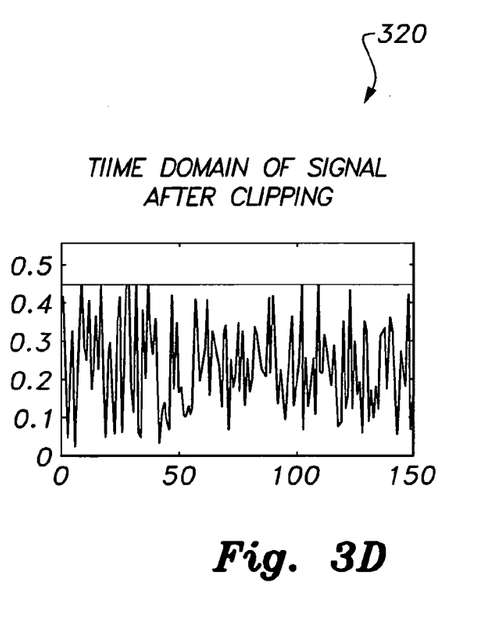

FIGS. 2A through 2C demonstrate the clipping problem. A time domain representation of the signal before clipping is shown at 205 in FIG. 2A. The clipping signal c is shown in waveform 210 of FIG. 2B. The time domain representation of the signal after clipping has been applied to it as shown in waveform 215 in FIG. 2C. As seen, clipping creates distortion in the frequency domain. The OFDM peak-to-average power ratio reduction method overcomes this problem by using a number of reserved tones to add a peak-reducing signal to the OFDM signal, thereby reducing the signal's Peak-To-Average Power Ratio (PAPR).

FIGS. 3A through 3D show the frequency and time domain representations of the OFDM signal before and after the addition of the peak clipping signal c. At the receiver, compressive sensing is used to extract the peak reducing signal c from the reserved tones, and then this signal is subtracted from the peak reduced OFDM signal.

Figure 4:
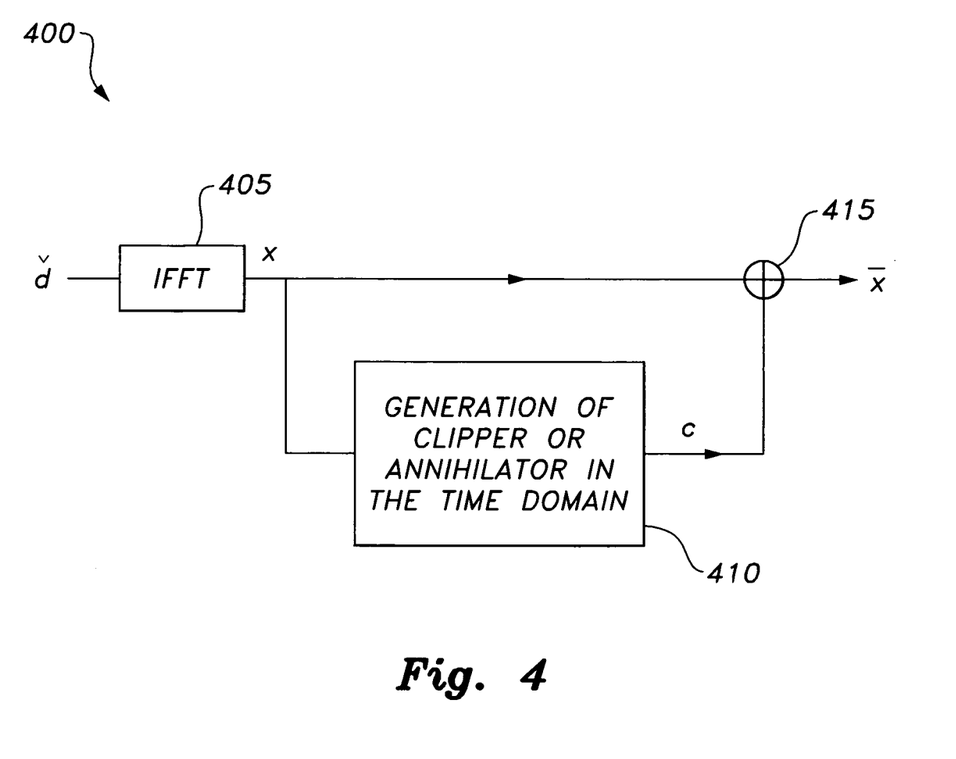
FIG. 4 is a block diagram showing how PAPR reduction is achieved at the transmitter in an OFDM peak-to-average power ratio reduction method according to the present invention.

As shown in FIG. 4, PAPR reduction is achieved at the transmitter 400 by using tone reservation and compressive sensing. The time domain OFDM signal x is constructed by inputting the data vector d' of whose entries are drawn from a QAM constellation to an IFFT block 405. The x signal, which is typically of very high PAPR, is split into a feedthrough portion and a clipper input portion. The clipper input portion is input to a clipping block 410. Clipping block 410 operates in the time domain and produces a peak-reducing signal c of an arbitrary spectral support at the transmitter. The peak-reducing signal c and the feedthrough signal x are added together in summation block 415 to produce reduced PAPR output signal $\bar{x}$.

The receiver utilizes properties of the spectrum of the reserved tones to estimates the reducing signal c, and then subtracts the reducing signal c from the demodulated signal. In the annihilator block 410, the present method conditions c to be sparse in time and then adds c to x all together with to provide the clipped OFDM signal $\bar{x}$. The present method ensures sparsity by setting a clipping threshold on the envelope of the OFDM symbols or, most preferably, having the transmitter clip the highest s peaks as shown in FIG. 1.

Consequently, the transmitted peak-reduced time domain signal is:

$$\bar{x} = x + c = F^H S_x \check{d} + c \quad (3)$$

where $S_x$ is an N×k selection matrix containing only one element equal to 1 per column, and with m=N−k "zero" rows. The columns of $S_x$ index the subcarriers that are used for data transmission in the OFDM system. The OFDM peak-to-average power ratio reduction method also denotes by S the N by m matrix with a single element equal to 1 per column, which spans the orthogonal complement of the columns of $S_x$.

Figure 5:
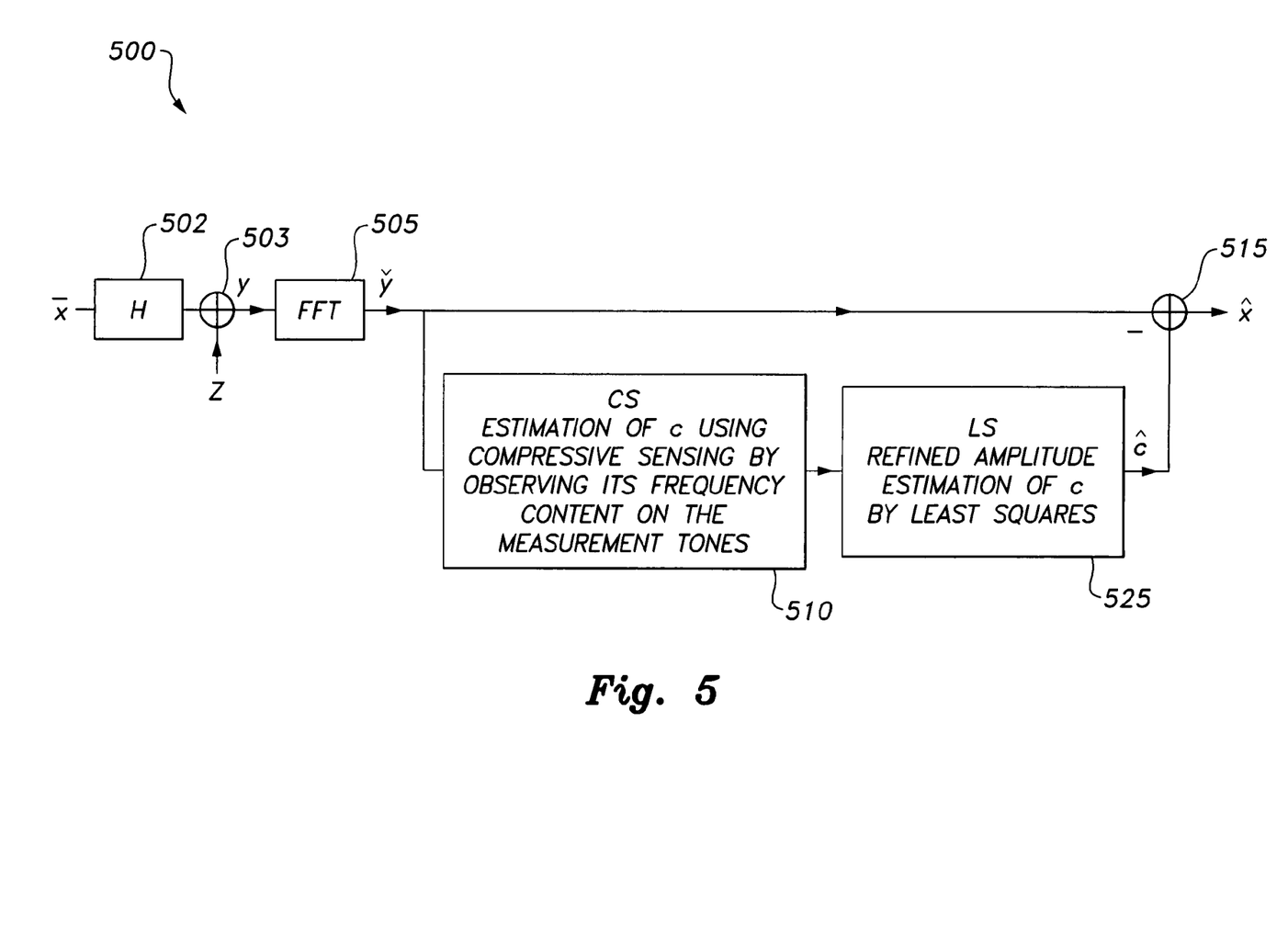
FIG. 5 is a block diagram showing the estimation and refining of a peak-reducing signal using compressive sensing and least squares, respectively, to yield an estimate of the original OFDM signal at the receiver in an OFDM peak-to-average power ratio reduction method according to the present invention.

As shown in FIG. 5, a receiver 500 utilizing the inventive OFDM peak-to-average power ratio reduction method has an H block 502 which sums the received reduced PAPR OFDM signal $\bar{x}$. As typical in OFDM receivers, the received signal is summed with a z signal in a summation block 503. The resultant is fed into an FFT block 505. The present method then splits the output $\check{y}$ of the FFT block 505 into a feedthrough component and an estimation component. Coarse and fine stages of estimation follow. The estimation component is input to a compressive sensing estimator 510. The output of the compressive sensing estimator is input to a least squares estimation block 525 which produces a fine estimate $\hat{c}$ which is subtracted from the feedthrough component in subtracting block 515 resulting in accurately estimated signal $\hat{x}$. As shown, the estimation and refining of the peak reducing signal uses compressive sensing and least squares respectively (the cardinality of the clipping signal is preferably known at the receiver) and subtracts it from the peak reduced signal to yield the estimate $\hat{x}$ of the original OFDM signal at the receiver.

The upshot of compressed sensing techniques is that if an N dimensional vector is s sparse, then the sparsity pattern of such a vector can be recovered non-combinatorially with a penalty on the additional number of measurements m, so that $s<m<<N$. In the OFDM peak-to-average power ratio reduction method, s represents the number of clipped peaks, m represents the number of reserved tones and N represents the number of sub-carriers in the OFDM signal. Since m is usually fixed, the number of clipped peaks s will depend on the number of reserved tones m. The received estimated OFDM signal $\bar{y}$ as shown in FIG. 5 after taking the DFT (in FFT block 505) is expressed as:

$$\bar{y} = Fy = F(H\bar{x} + z) \qquad (4)$$
$$= F(F^H DF(F^H S_x \breve{d} + c) + z)$$
$$= DS_x \breve{d} + DFc + \bar{z}$$

where $\breve{z}=Fz$ has the same distribution of z since F is unitary. Assuming the channel is known at the receiver, c can be estimated by projecting $\bar{y}$ onto the orthogonal complement, thus yielding: $\grave{y}$ $$\grave{y} = S^T \bar{y} = S^T DFc + \breve{z} \qquad (5)$$

where $\breve{z}=Fx$ is an m×1 independent and identically distributed (i.i.d.) Gaussian vector with variance $N_0$.

The m×N projection matrix obtained by a row selection of F (according to S) is denoted by $\Psi=S^T DF$. The observation vector $\grave{y}$ is a projection of the sparse N-dimensional peak-reducing signal c onto a basis of dimension $m<<N$ corrupted by $\breve{z}$. Thus, the peak reducing s sparse signal (in time) c can be estimated at the receiver using (5) via compressive sensing by using the Candes-Randall-Tao Second Order Cone Program (SOCP) estimator adapted to complex vectors:

$$\min \|\tilde{c}\|_1$$
$$s.t. \|\grave{y} - \Psi_{\tilde{c}}\|_2 \leq \epsilon \qquad (6).$$

The resulting solution by compressive sensing alone is an estimate $\hat{c}$ of the peak-reducing signal, which not only reliably detects the positions of its nonzero entries, but also gives a good approximation to the corresponding amplitudes. LS block 525 can further refine the solution if the cardinality of the s is know at the receiver, e.g., if it was transmitted as side information, using least squares.

Figure 6:
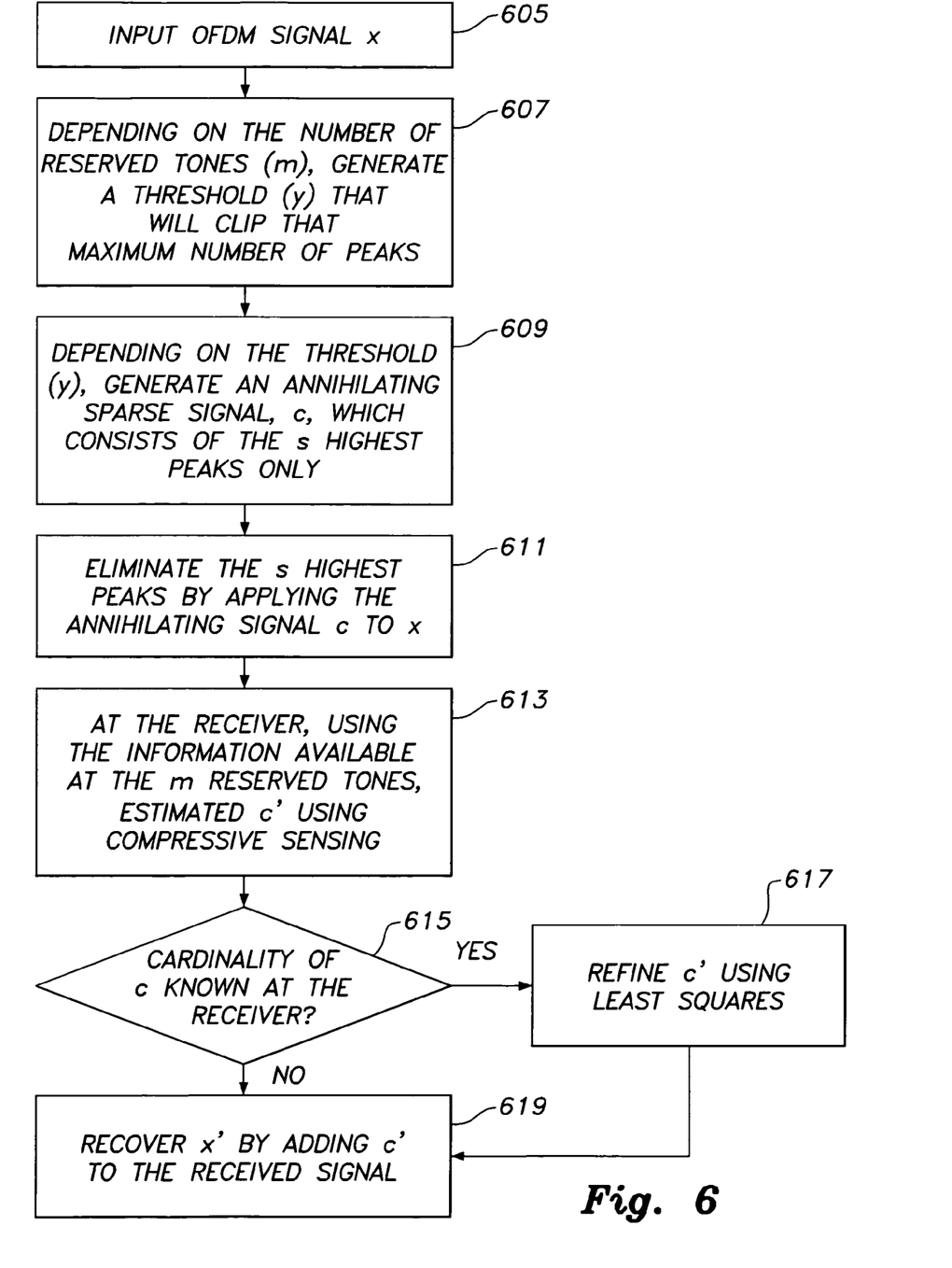
FIG. 6 is a flowchart showing how PAPR reduction is achieved at the transmitter and how the original OFDM signal is estimated at the receiver in an OFDM peak-to-average power ratio reduction method according to the present invention.

As shown in FIG. 6, the OFDM peak-to-average power ratio reduction method achieves PAPR reduction at the transmitter and estimates the original OFDM signal at the receiver. The OFDM signal is input at step 605. At step 607, a clipping threshold is generated based on the number of reserved tones. At step 609, an annihilating sparse signal consisting of only the s highest peaks is generated. At step 611, the s highest peaks are eliminated by applying the annihilating signal c to x. At step 613, the receiver estimates the additive peak reducing signal $\hat{c}$ using the m received tones. Since c is sparse in time, it can be estimated at the receiver by partially observing its spectral support. As shown at step 615, if the cardinality of c is known at the receiver, then $\hat{c}$ can be refined at step 617 by using least squares. At step 619, x is recovered by adding $\hat{c}$ to the received signal.

Since m is normally fixed, care should be exercised when choosing the optimum number of clipped peaks s*. If s is increased, the Symbol Error Rate (SER) would also increase as the estimated amplitudes and their positions will be inaccurate. If s is decreased, the PAPR reduction capability is sacrificed. More specifically, it has been generally accepted that a necessary condition for the estimation of c is:

$$m > \frac{2}{MAR \cdot SNR} s\log(N-s) + s - 1 \qquad (7)$$

where the SNR and the Minimum-to-Average-Ratio (MAR) are defined as follows:

$$SNR = \frac{E[\|\psi_c\|]^2}{E[\|\breve{z}\|]^2} \qquad (8)$$

$$MAR = \frac{\min_{j \in c} |c_j|}{\|c\|^2 / s}. \qquad (9)$$

At the receiver, the frequency distortion that was naturally induced by clipping the highest s peaks at the transmitter on the reserved tones acts as partial measurements, which the present method uses to recover the original peak reducing signal using CS.

Figure 7:
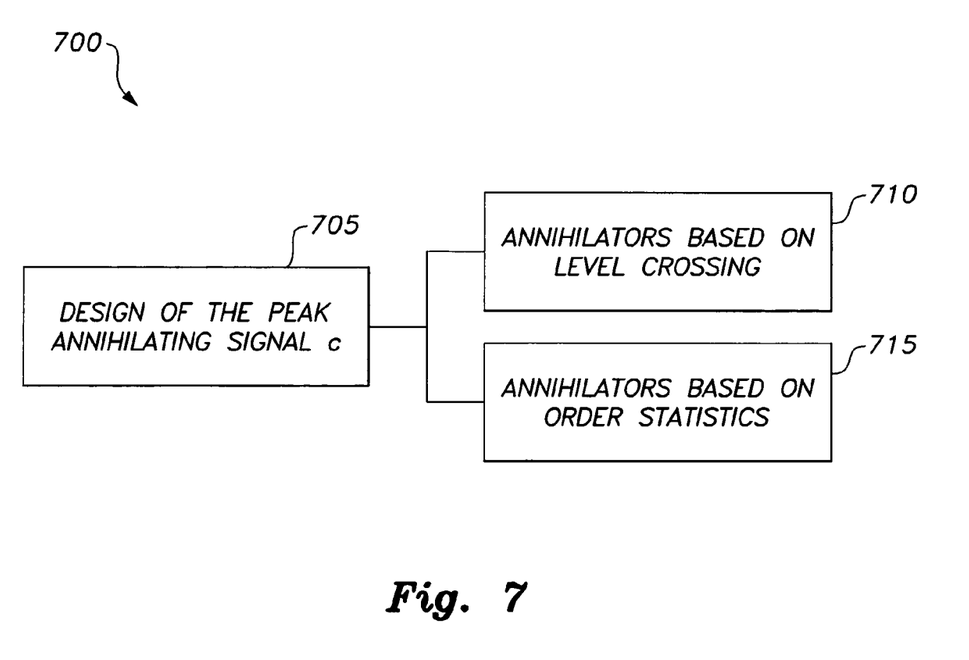
FIG. 7 shows a block diagram demonstrating how a peak-reducing signal can be designed in an OFDM peak-to-average power ratio reduction method according to the present invention 6.

Referring to FIG. 7, an exemplary design of the peak reducing signal is shown. The design step 705 may be comprised of either constructing annihilators based on level crossing according to step 710 or constructing annihilators based on order statistics according to step 715. The simplest design is to base the annihilating signal on a threshold (Level Crossing). For the least amount of temporal and spatial complexity at the transmitter, the present method could set an optimal clipping threshold y* in which, for a given SNR and recovery algorithm, the probability of exceeding a number of clips s* is small. The peak-reducing signal will hence take the form:

$$c = \sum_{i: |x_i| \geq \gamma} x_i \delta(n - n_i) \qquad (10)$$

where $n_i$ corresponds to the location at $|x_i|$ that exceeds y. For simplicity the present method assumes annihilation is done on the OFDM signal sampled at the Nyquist rate, causing the entries of x to be uncorrelated. Furthermore, the present method assumes that the real and imaginary parts of x are asymptotically Gaussian processes for large N. This implies that the entries of x are independent and that the envelope of x can be modeled as a sequence of i.i.d Rayleigh random variables with a common cumulative distribution function (CDF) $F_{|x|}(|x|)$.

Let s be the number of crossings of x to a fixed threshold y, then $$s = \sum_{i=1}^{N} I(x_i : \gamma) \text{ where } (x_i : \gamma) = \begin{cases} 1 & \text{if } |x_i| \geq \gamma \\ 0 & \text{otherwise} \end{cases}.$$

The sparsity s at a given y is now a random variable corresponding to the number of annihilated entries of x with a CDF:

$$E_S(s;\gamma) = \sum_{i=0}^{s}\binom{N}{i}(1-F_{|x|}(\gamma))^i F_{|x|}(\gamma)^{N-i} \approx \qquad (11)$$

$$e^{-N(1-F_{|x|}(\gamma))}\sum_{i=0}^{s}\frac{[N(1-F_{|x|}(\gamma))]^i}{i!}.$$

To uphold the condition in (7), the present method finds a corresponding annihilating threshold where $$\lambda^* = \sup\left\{\lambda : e^{-\lambda}\sum\frac{\lambda^i}{i!} \geq 1-\varepsilon\right\}$$

where $\lambda=N(1-F_{|x|}(\gamma))$, then simply substituting in $$\lambda^* = F_{|x|}^{-1}\left(1-\frac{\gamma^*}{N}\right) = \left(-2\sigma^2\ln\frac{\gamma^*}{N}\right)^{1/2},$$

where $\sigma$ is the parameter of the Rayleigh distribution function $F_{|x|}(x)$.

Although such an approach is the simplest to implement at the transmitter, it will result in poor recovery at the receiver since the variance of the required number of measurements m (which is a function of s) will be large.

As shown in FIG. 7, the second design method 715 bases the annihilating signal on Order Statistics. In this technique, the transmitter supplies the receiver with the cardinality s of c at initialization. This approach offers significant improvement in terms of SER at the minor cost of increasing the number of comparisons from N (with y) in the previous case to a number of ordered selections upper bounded by N−s+(s−1)[$\log_2$(N−s+2)], which is actually very close to N for s<<N.

If the present method lets $x_{i:N}$ denote the $i^{th}$ order statistic of x, then c can be expressed as $$c = -\sum_{j=N-s}^{N}\chi_{j:N}\delta(n-n_i).$$

In this case, the PAPR is a random variable. The power P of a coefficient in x can be approximated by a Chi-square random variable of two degrees of freedom, and denoting by FP the CDF of P, the CCDF of the highest power $P_{max}$ is:

$$\bar{F}_{Pmax}(P) = Pr\{\chi^2_{N-s:N} > P\} \qquad (12)$$

$$= 1 - \sum_{k=N-s}^{N}\binom{N}{K}(F_P)^k(1-F_P)^{N-k}$$

$$= 1 - I_{F_P}(N-s, s+1)$$

where the last expression is Pearson's incomplete beta function. The advantages of this approach include more efficient utilization of the measurement tones and increased reliability of the recovery algorithm. This includes improving both the sparsity pattern and amplitude recovery, resulting in a significantly lower SER. The justification for this is as follows.

In the presence of noise, the estimate ĉ of c will not be a strictly sparse vector. It will have relatively smaller values at the locations of which the original vector was null (assuming the estimation is good). This requires setting a threshold on the entries of the estimated vector to differentiate between actual nonzero entries of c and noise. Finding such an optimal threshold that would minimize the probability of error is not straightforward.

On the other hand, if the receiver were to know the cardinality of c, then the compressive sensing estimate of the sparsity pattern can be enhanced by selecting the positions corresponding to the s maximum values in ĉ as the true support of c. Once these positions have been registered, the amplitude estimate can now be refined by the least squares step 617, as shown in FIG. 6, provided that the present method denotes the indexing set that registers the positions of the highest s nonzero entries in c' by $\hat{J}^{cs},\hat{S}_c$, the N×s selection matrix corresponding to $\hat{J}^{cs}$ and $u_c$, the s×1 vector that contains the non-zero entries of c. Then, the present method can express $c = \hat{S}_c u_c$ and update equation (5) to:

$$\acute{y} = S^T DF\hat{S}_c u_c + \acute{z} \qquad (13)$$

$$= \Phi_c u_c + \acute{z}.$$

Then, using least squares, estimate $\hat{u}_c^{ls}=(\Phi_c^H\Phi_c)^{-1}\Phi_c^H\acute{y}$. The refined estimate $c^{ls}$ of c is:

$$c^{ls}=S_c(\Phi_c^H\Phi_c)^{-1}\Phi_c^H\acute{y} \qquad (14)$$

Figure 8:
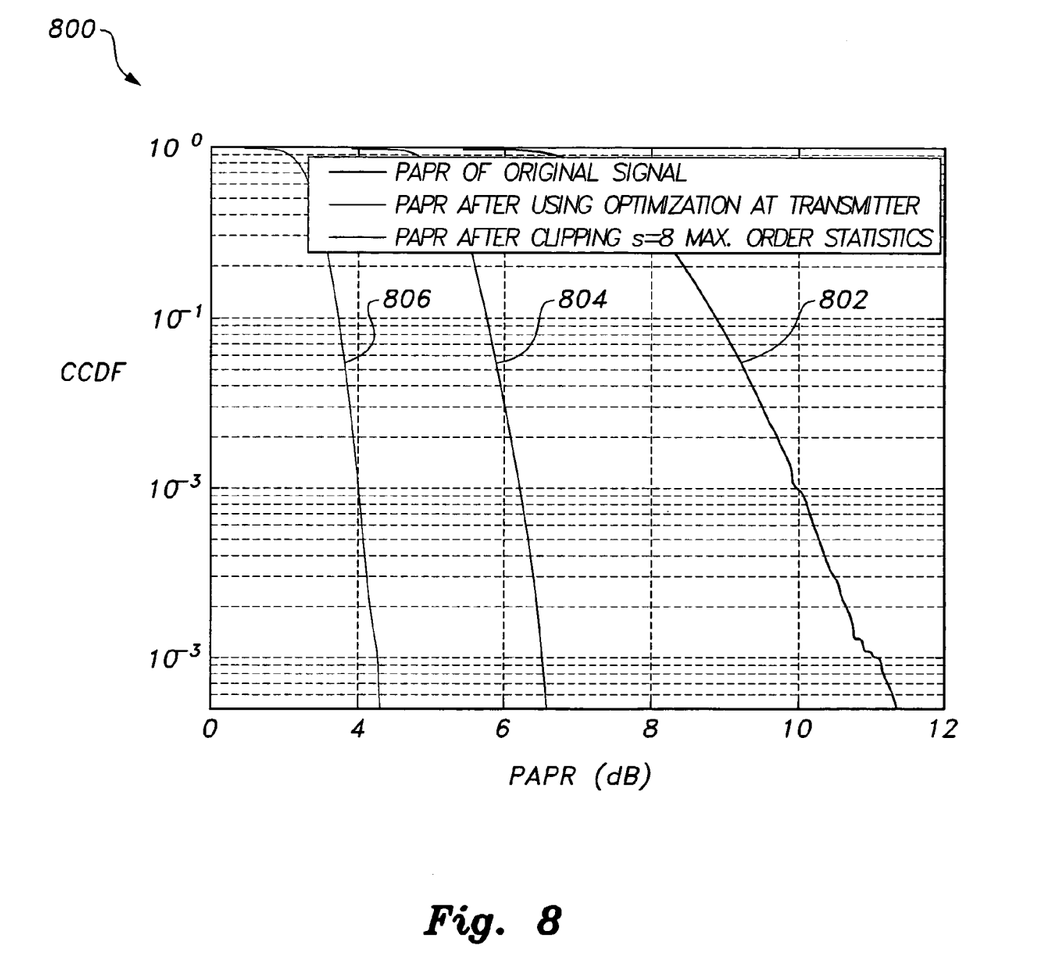
FIG. 8 is a plot comparing the Peak-to-Average-Power Ratio using compression sensing, optimization at the transmitter, and without any optimization.

Referring to FIG. 8, a plot 800 comparing the Peak-to-Average-Power Ratio using compression sensing optimization at the transmitter vs. no optimization is shown. In this case and what follows, N is set=256, m=20% of N, a constellation size M=32 and the highest 8 peaks of 1000 OFDM blocks are annihilated. Results show that at a PAPR excursion probability of $10^{-3}$, the algorithm yields good results 804 and 806 when compared to signal 802 when no PAPR reduction technique is employed. For a given number of reserved tones, m, the present method can only clip s<m maximum peaks. Moreover, looking at the complexity factor, which is crucial in PAPR reduction schemes, the technique justifies its utility in terms of reduced complexity.

Figure 9:
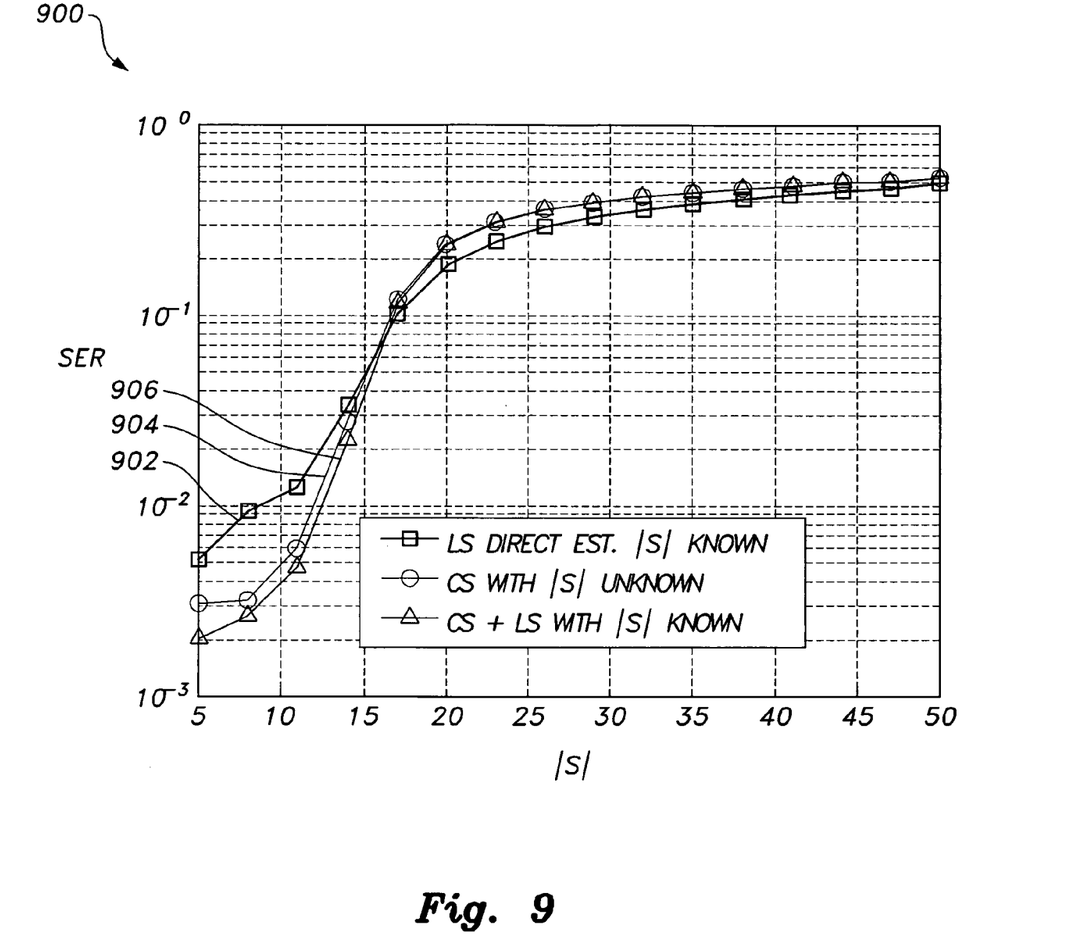
FIG. 9 is a plot showing the Symbol Error Rate against the number of reserved tones for different peak reduction schemes.

Referring now to FIG. 9, Plot 900 demonstrates a few Symbol Error Rate comparisons. Curve 902 utilizes a least squares direct estimate when |s| is known. Curve 904 utilizes compressive sensing when |s| is unknown. Curve 906 utilizes compressive sensing combined with least squares when |s| is known. The comparison of the SER when using CS alone, CS with refined estimate of c and when using Least Squares alone with an estimate $\tilde{J}^x$ of the sparsity pattern of c based on selecting the s smallest values of $\bar{x}$ instead of compressive sensing such that $\hat{J}^x=\arg_j\{|\bar{x}|_{1:N}, |\bar{x}|_{2:N}, \ldots, |\bar{x}"_{x:N}\}$. The reason is that, since the present method annihilates the highest peaks of x, the present method expects the sparsity pattern of c after noise addition at the receiver to correspond to the positions of where $\bar{x}$ is minimum. It should be noted that the cardinality of c is required at the receiver for LS. As seen, the knowledge of s offers significant advantage to CS when s is unknown at the receiver. LS only outperforms the two cases of CS when the sparsity condition is in (7) is violated. In that case, the estimate given by all three techniques cannot be used.

Figure 10:
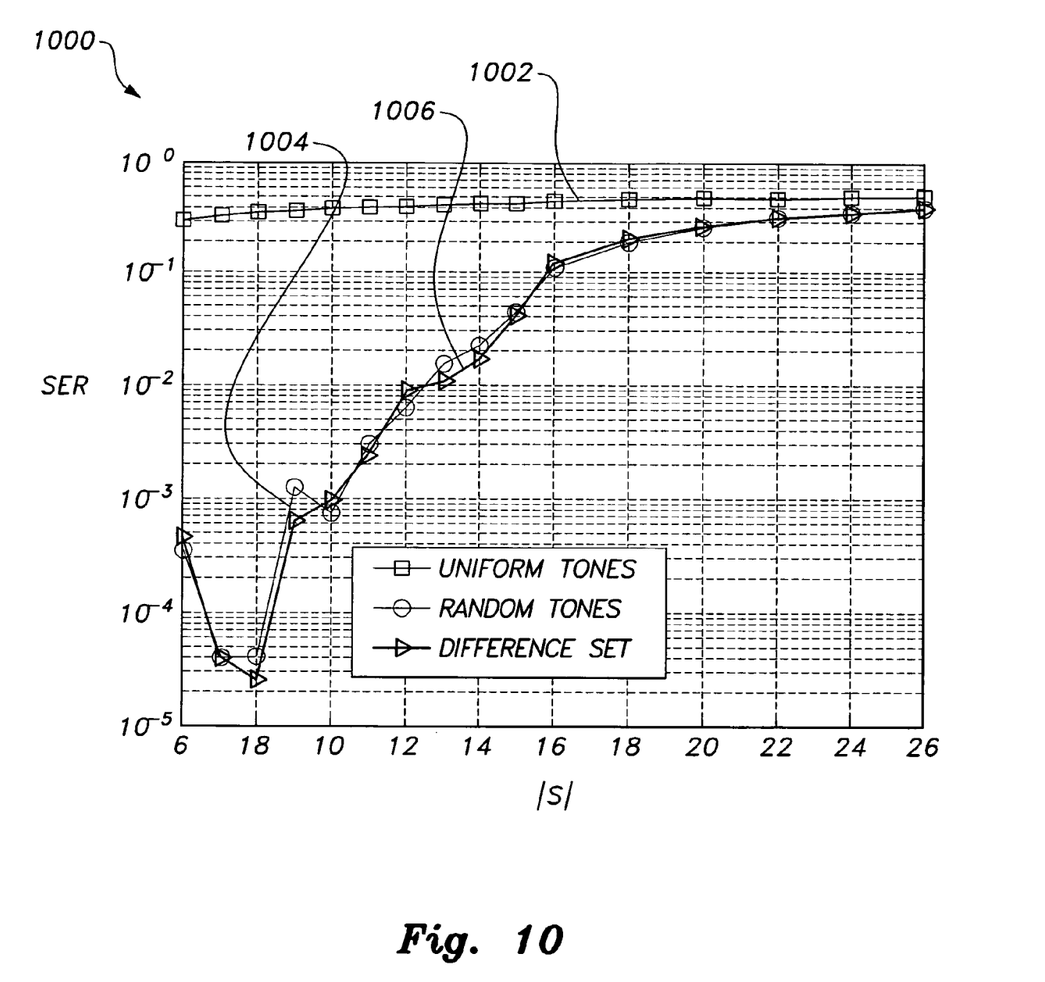
FIG. 10 is a plot showing the Symbol Error Rate against the number of reserved tones for different tone positioning schemes.

Referring to FIG. 10, a plot 1000 demonstrating the Symbol Error Rate against the number of reserved tones for different tone positioning schemes is shown. Curve 1002 illustrates the uniform tones case. Curve 1004 illustrates the random tones case. Curve 1006 illustrates the difference set case.

In the random case 1004, m tones were drawn randomly from N. In the uniform case 1002, m tones were positioned uniformly over the spectrum of x. And, in the difference set 1006, m and N were selected to compose a difference set. In this case the present method was limited in the selection of N and m, and the closest setting found to the original one was N=197 and m=49 with $\Omega_c$ matching a (197, 49, 12) difference set known in the art. As shown in FIG. 10, uniform tone positioning results in extremely poor performance of compressive sensing algorithms. Also, it is shown that random tone assignment is nearly optimal. Although the use of difference sets appears to outperform random positioning, the optimality of such an approach and the extent to which they can improve recovery is still unknown.

Figure 11:
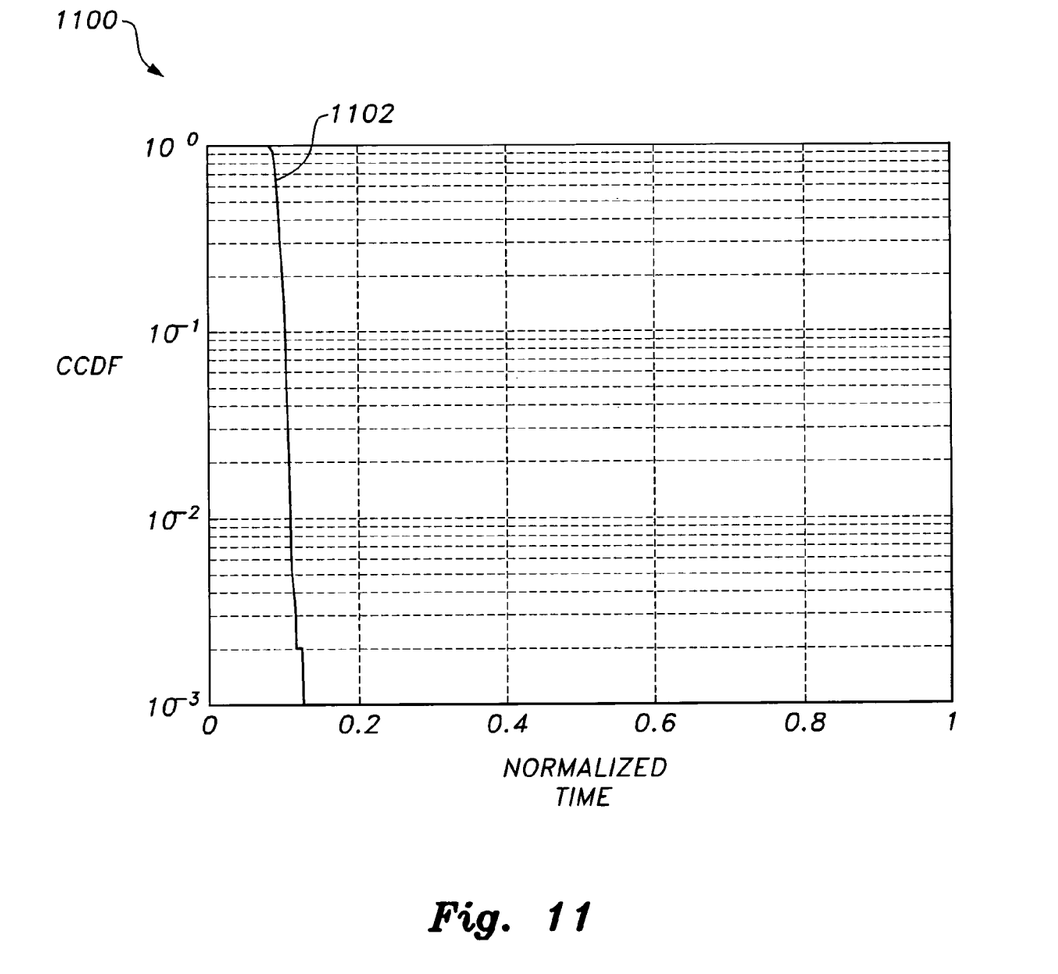
FIG. 11 is a plot showing the empirical CCDF of the normalized relative time required to execute 1000 runs in an OFDM peak-to-average power ratio reduction method according to the present invention.

As shown in FIG. 11, temporal complexity analysis yields a plot 1100 illustrating the empirical common CDF of the normalized relative time required to execute 1000 runs of the OFDM peak-to-average power ratio reduction method using the aforementioned CS technique. The average time 1102 required to perform the optimization was nominally small when using CS. This again justifies the use of CS to reduce the complexity of PAPR reduction.

It is to be understood that the present invention is not limited to the embodiments described above, but encompasses any and all embodiments within the scope of the following claims.

We claim:

1. A peak-to-average power ratio reduction method in an orthogonal frequency division multiplexing (OFDM) transmitter, the method comprising the steps of:
    generating a baseband OFDM symbol while reserving a fixed subset of null tones in random distribution over an available transmission spectrum;
    increasing the number of reserved tones, thereby improving the peak-to-average power ratio reduction while yielding an improved estimate of a peak-reducing signal at a receiver of an OFDM signal, wherein a Symbol Error Rate is improved;
    generating a sparse time domain peak-reducing signal;
    adding the peak-reducing signal to the OFDM signal, thereby annihilating peaks of the OFDM signal exceeding a predetermined clipping threshold; and
    transmitting the OFDM signal, wherein reserved null tones are no longer null due to the addition of the peak-reducing signal.

2. The peak-to-average power ratio reduction method according to claim 1, further comprising the step of:
    utilizing the peak-reducing signal to directly operate on only the highest peaks of the OFDM signal.

3. The peak-to-average power ratio reduction method according to claim 1, wherein the predetermined clipping threshold is consistent with sparsity of the peak-reducing signal.

4. The peak-to-average power ratio reduction method according to claim 1, wherein the peak-reducing signal is a function of the number of reserved tones.

5. The peak-to-average power ratio reduction method according to claim 4, wherein the reserved tones provide spectral support for the peak-reducing signal, thereby reducing computational complexity of the peak-to-average power ratio reduction method.

6. The peak-to-average power ratio reduction method according to claim 1, wherein the peak-reducing signal is formulated based on a threshold level crossing of an original OFDM signal.

7. The peak-to-average power ratio reduction method according to claim 1, wherein the peak-reducing signal is formulated based on order statistics of an original OFDM signal.

8. The peak-to-average power ratio reduction method according to claim 7, wherein the transmitter sends a cardinality of the peak-reducing signal based on said order statistics of the original OFDM signal, the cardinality being sent by the transmitter as side information for use in a receiver's initialization process.

9. A peak-to-average power ratio (PAPR) reduction method in an orthogonal frequency division multiplexing (OFDM) receiver, the method comprising the steps of:
    reserving null tones in random distribution over an available transmission spectrum;
    increasing the number of reserved tones, thereby improving peak-to-average power ratio reduction while yielding an improved estimate of a peak-reducing signal at a receiver of an OFDM signal, wherein a Symbol Error Rate is improved;
    receiving a reduced PAPR OFDM signal;
    estimating a peak-reducing signal by observing spectral content of reserved null tones of the OFDM signal received by the receiver; and
    subtracting the estimated peak-reducing signal from the received OFDM signal, thereby recovering an estimate of an original OFDM signal.

10. The peak-to-average power ratio reduction method according to claim 9, further comprising the steps of:
    estimating the peak-reducing signal by using partial measurements on the reserved tones induced at the receiver;
    compressively sensing the reserved tones, thereby recovering the peak-reducing signal amplitudes and their positions at the receiver in order to reduce the complexity of the PAPR reduction method.

11. The peak-to-average power ratio reduction method according to claim 9, wherein the step of estimating the peak-reducing signal by using the partial measurements on the reserved tones induced at the receiver is performed by a Candes-Randall-Tao SOCP Estimator.

12. The peak-to-average power ratio reduction method according to claim 9, wherein the estimated peak-reducing signal is refined at the receiver by using Least Squares.

13. The peak-to-average power ratio reduction method according to claim 12, wherein the refined peak-reducing signal is subtracted from the received peak-reduced OFDM signal, thereby recovering a refined estimate of the original OFDM signal.

14. An orthogonal frequency division multiplexing (OFDM) transceiver, comprising:
    means for generating a baseband OFDM symbol while reserving a fixed subset of null tones;
    means for generating a sparse time domain peak-reducing signal;
    means for adding the peak-reducing signal to an OFDM signal, thereby annihilating peaks of the OFDM signal exceeding a predetermined clipping threshold;
    means for reserving null tones in random distribution over an available transmission spectrum;
    means for increasing the number of reserved tones, thereby improving the peak-to-average power ratio reduction while yielding an improved estimate of the peak-reducing signal at a receiver of the OFDM signal, wherein a Symbol Error Rate is improved;

means for transmitting the OFDM signal, wherein the reserved null tones are no longer null due to the addition of the peak-reducing signal;

means for receiving a reduced peak-average-power ratio OFDM signal;

means for estimating a peak-reducing signal by observing spectral content of reserved null tones of the OFDM signal received by the transceiver; and means for subtracting the estimated peak-reducing signal from the received OFDM signal, thereby recovering an estimate of an original OFDM signal.

15. The OFDM transceiver according to claim 14, further comprising:

means for estimating the peak-reducing signal by using partial measurements on the reserved tones induced at the receiver;

means for compressively sensing the reserved tones, thereby recovering the peak reducing signal amplitudes and their positions at the transceiver, thereby reducing complexity of peak-average-power ratio reduction.

16. The OFDM transceiver according to claim 15, wherein said means for compressive sensing estimation comprises a Candes-Randall-Tao SOCP Estimator.

* * * * *